United States Patent
Takahashi

(10) Patent No.: US 8,088,520 B2
(45) Date of Patent: Jan. 3, 2012

(54) POWER SUPPLY APPARATUS WITH PIEZOELECTRIC HEAT TRANSFER ELEMENT

(75) Inventor: Izumi Takahashi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 755 days.

(21) Appl. No.: 12/278,888

(22) PCT Filed: Nov. 8, 2007

(86) PCT No.: PCT/JP2007/071731
§ 371 (c)(1),
(2), (4) Date: Aug. 8, 2008

(87) PCT Pub. No.: WO2008/059754
PCT Pub. Date: May 22, 2008

(65) Prior Publication Data
US 2009/0092871 A1    Apr. 9, 2009

(30) Foreign Application Priority Data
Nov. 15, 2006    (JP) .................................. 2006-309138

(51) Int. Cl.
    *H01M 10/50*    (2006.01)
(52) U.S. Cl. .................. 429/426; 165/104.18; 165/200; 165/233; 429/120; 429/434; 429/436
(58) Field of Classification Search ............... 165/104.8, 165/233, 200; 429/120, 434, 436; 310/311
    See application file for complete search history.

(56) References Cited

U.S. PATENT DOCUMENTS

| 4,604,529 A | * | 8/1986 | Grimsley et al. ............ 307/10.1 |
| 5,524,681 A | * | 6/1996 | Davies et al. ................. 141/92 |
| 2006/0246345 A1 | | 11/2006 | Yoon et al. | |

FOREIGN PATENT DOCUMENTS

| EP | 1 394 890 A2 | | 3/2004 |
| JP | 2-33492 | | 3/1990 |
| JP | 02117044 A | * | 5/1990 |
| JP | 11-026031 A | | 1/1999 |
| JP | 11-040211 A | | 2/1999 |
| JP | 2000134958 A | * | 5/2000 |
| JP | 2002-124224 A | | 4/2002 |
| JP | 2004-213996 A | | 7/2004 |
| JP | 2004-288527 A | | 10/2004 |
| JP | 2004-327223 A | | 11/2004 |
| JP | 2005-353480 A | | 12/2005 |

OTHER PUBLICATIONS

JP 2002-124224 raw machine English translation.*
JP 2000-134958 raw machine English translation.*
"Development of Electrostrictive Polymer Actuators for Active Control of Turbulence" by Tsutsui et al, from the proceedings of the 2001 Meeting of the Japanese Society of Fluid Mechanics.*

* cited by examiner

*Primary Examiner* — Patrick Ryan
*Assistant Examiner* — Lucas O Donnell
(74) *Attorney, Agent, or Firm* — Kenyon & Kenyon LLP

(57) ABSTRACT

The power supply apparatus includes a power supply unit, a piezoelectric element for transferring heat of the power supply unit to a floor panel, and an element power supply control circuit for controlling application of a voltage to the piezoelectric element. The piezoelectric element is placed between the power supply unit and the floor panel and is switched between a contact state in which the piezoelectric element is in contact with the power supply unit and the floor panel and a non-contact state in which the piezoelectric element is not in contact with the power supply unit and/or the floor panel in accordance with the application of a voltage.

10 Claims, 4 Drawing Sheets

POWER SUPPLY APPARATUS WITH PIEZOELECTRIC HEAT TRANSFER ELEMENT

TECHNICAL FIELD

The present invention relates to a power supply apparatus including a heat transferring portion for transferring heat of a power supply unit to a heat releasing portion.

BACKGROUND ART

Secondary batteries and fuel cells are used for powering or as auxiliary power units of hybrid cars, electric vehicles, and fuel-cell electric vehicles. Those batteries have disadvantages that the terminal voltage and the electrical capacitance are reduced at a low temperature and the electrolyte is decomposed at a high temperature to produce gas to increase the internal pressure, resulting in shortened battery life.

Some methods have been proposed for maintaining the power supply under proper temperature conditions. Laid-open Japanese Utility Model Registration Application No. 02(1990)-33492 (Patent Document 1) has disclosed a heat radiator for a battery-powered electronic device. The heat radiator for a battery-powered electronic device includes a heat transferring portion for transferring heat radiated from a heat producing portion to a battery and a shape-memory member placed between the heat transferring portion and the battery. The shape-memory member is displaced to separate the battery from the heat transferring portion at a predetermined transformation temperature or higher and to bring the battery into contact with the heat transferring portion at a temperature lower than the transformation temperature.

With this configuration, the battery can be activated by the heat transferred from the heat producing portion at a temperature lower than the transformation temperature. On the other hand, at a temperature higher than the transformation temperature, the heat transfer from the heat producing portion can be blocked to prevent deterioration of battery properties due to overheating.

Another prior art is Japanese Patent Laid-Open No. 2002-124224 (Patent Document 2) which has disclosed a battery pack including a metal heat radiator. The battery pack includes a heat-sensitive deformable element placed fixedly on a side of a battery case. If the temperature of the battery rises to exceed a predetermined level, the heat-sensitive deformable element is deformed and brought into contact with the metal heat radiator.

Since the heat-sensitive deformable element can be kept from contact with the metal heat radiator at a temperature equal to or lower than the predetermined level, the heat of the overheated metal heat radiator can be prevented from being transferred to the battery.

[Patent Document 1] Laid-open Japanese Utility Model Registration Application No. 02 (1990)-33492

[Patent Document 2] Japanese Patent Laid-Open No. 2002-124244

DISCLOSURE OF THE INVENTION

Problems to be Solved by the Invention

The transformation temperature of the shape-memory member and the heat-sensitive deformable element (hereinafter referred to as the shape-memory member or the like) depends on the materials of the shape-memory member or the like.

In addition, proper operating temperatures vary depending on the type of a power supply. For example, a lithium-ion secondary battery has a proper operating temperature from 10 to 60° C., and a fuel cell using a solid polymer as an electrolyte has a proper operating temperature from room temperature to approximately 100° C. (Tokyo Gas: I see ! The Fuel Cell—Different features due to yield temperature (retrieved 27, Sep. 2006), see URL: http://www.Tokyo-gas.co.jp/pefc_e/what-fc_32.html).

Thus, the materials of the heat-sensitive deformable element or the like should be changed according to the type of a power supply in the prior art, which may take much effort in selection of materials and increase cost.

In view of the abovementioned problem, it is an object of the present invention to provide a power supply apparatus including a heat transferring portion for radiating heat of a power supply unit to a heat releasing portion with a reduced cost.

Means for Solving Problems

To solve the abovementioned problem, the present invention provides a power supply apparatus including a power supply unit, a heat transferring portion formed of an electromechanical energy conversion element for transferring heat of the power supply unit to a heat releasing portion, and a controller that controls application of a voltage to the heat transferring portion, wherein the heat transferring portion is placed between the power supply unit and the heat releasing portion and is switched between a contact state in which the heat transferring portion is in contact with the power supply unit and the heat releasing portion and a noncontact state in which the heat transferring portion is not in contact with the power supply unit and/or the heat releasing portion in accordance with the application of a voltage.

The controller preferably controls the application of a voltage in accordance with the temperature of the power supply unit. Specifically, the controller preferably controls the application of a voltage to cause the heat transferring portion to be in the noncontact state when the temperature of the power supply unit is equal to or lower than a threshold value.

The power supply apparatus preferably includes a holding portion for holding the power supply unit such that the power supply unit and the heat releasing portion are spaced. The power supply apparatus preferably includes temperature detecting portion that detects the temperature of the power supply unit, and the controller preferably controls the application of a voltage based on the detection result of the temperature detecting portion.

The temperature detecting portion preferably outputs temperature information to a coolant supplying portion that supplies a coolant to the power supply unit based on the temperature of the power supply unit.

The heat transferring portion preferably includes an insulating filler. The heat releasing portion is preferably a body of a vehicle. The power supply apparatus preferably includes a heat transfer power supply portion for producing a voltage to be applied to the heat transferring portion, and the heat transfer power supply portion is preferably independent of the power supply unit.

Effects of the Invention

According to the present invention, even when power supply units having different proper operating temperature are used, the heat radiation of the power supply units can be controlled by using the same configuration without changing the materials of the component.

BEST MODE FOR CARRYING OUT THE INVENTION

A preferred embodiment of the present invention will hereinafter be described.

Embodiment 1

Figure 1:
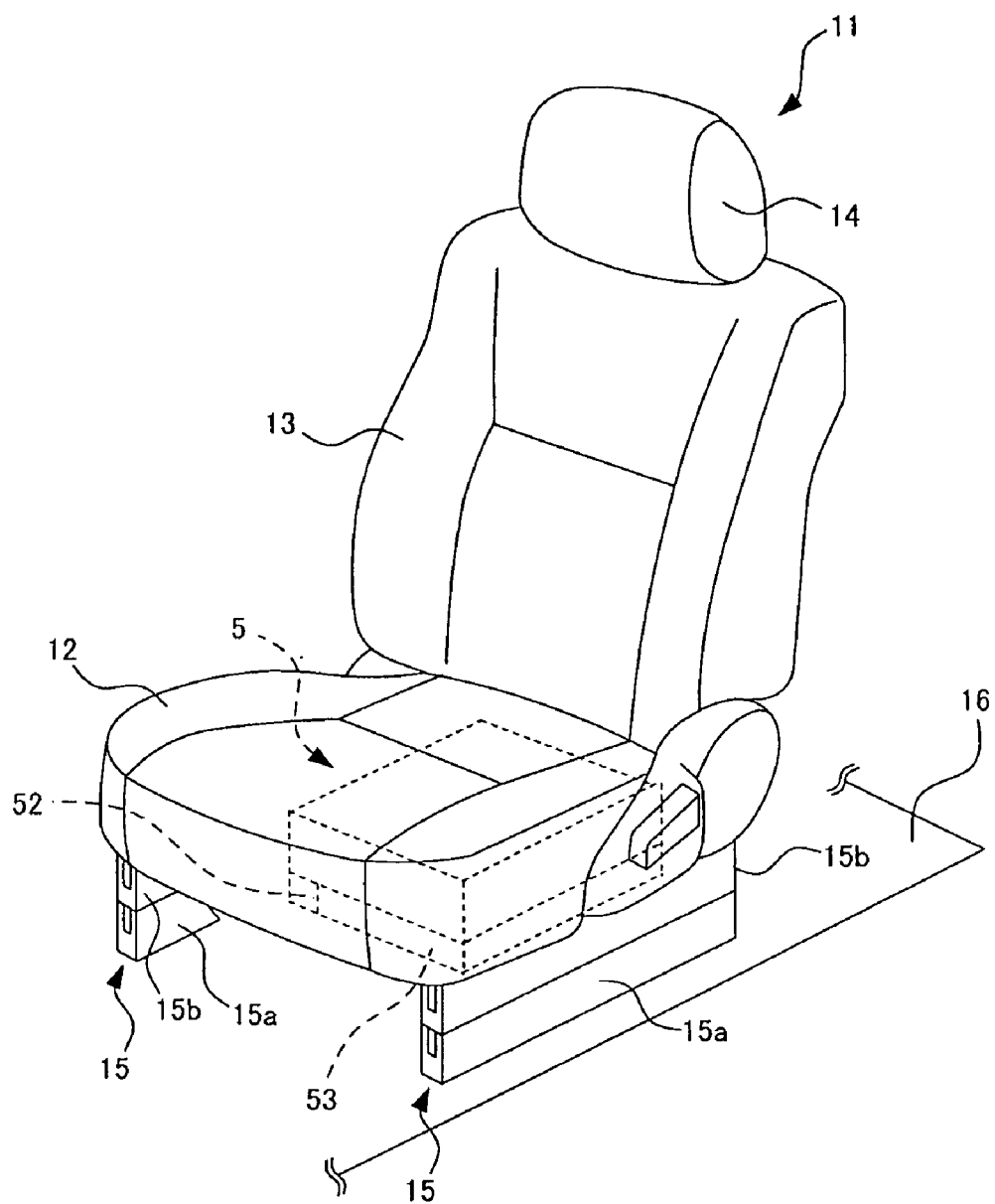
[FIG. 1] A perspective view showing a passenger seat of a vehicle to which a power supply apparatus according to the present invention is applied.

FIG. 1 is a perspective view showing a passenger seat 11 of a vehicle on which a power supply apparatus according to the present invention is mounted. The passenger seat 11 has a seat 12 and a back rest 13. A head rest 14 is removably attached to the top end of the back rest 13.

A pair of seat rails is provided under the seat 12 to extend in a front-to-back direction and opposite to each other in a width direction.

Each of the seat rails 15 is formed of a lower rail 15a fixed onto a floor panel (heat releasing portion) 16 and an upper rail 15b fixed to a lower surface of the seat 12 and slidable over the lower rail 15a in a longitudinal direction thereof and guided by the lower rail 15a. The seat rails 15 allow adjustments of the position of the passenger seat 11 in the front-to-back direction of the vehicle.

A power supply apparatus 5 is provided between the pair of seat rails 15 and is installed on the floor panel 16.

Figure 2A:
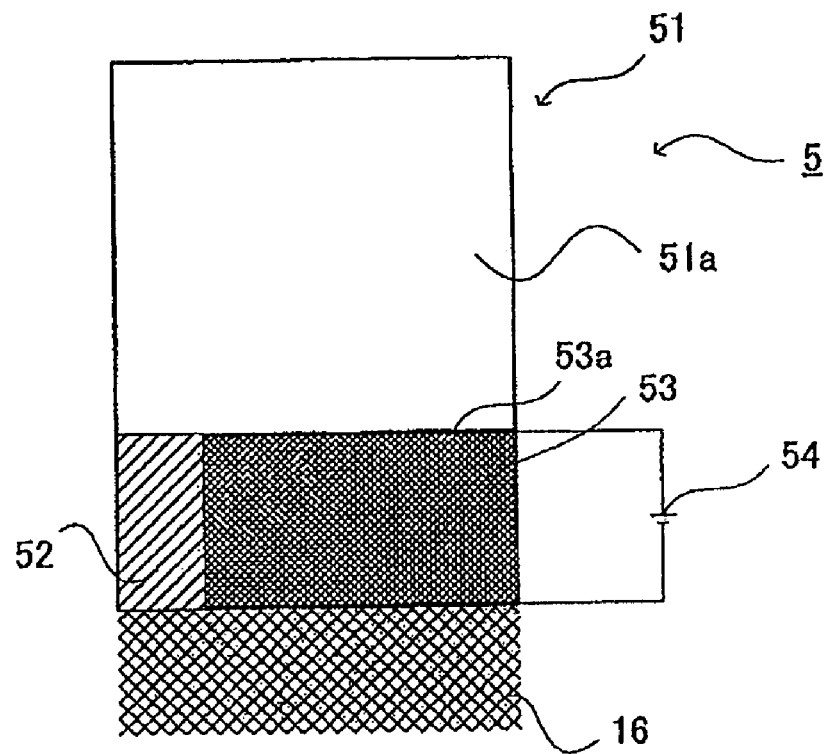
[FIG. 2A] A section view showing the power supply apparatus set to a heat releasing state.
Figure 2B:
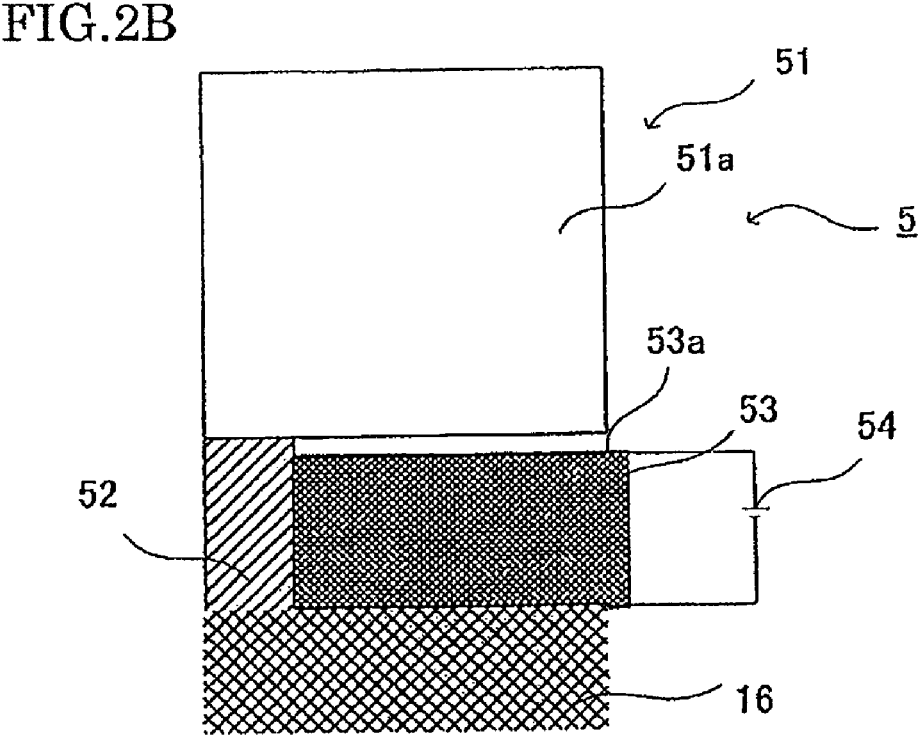
[FIG. 2B] A section view showing the power supply apparatus set to a heat insulating state.
Figure 3:
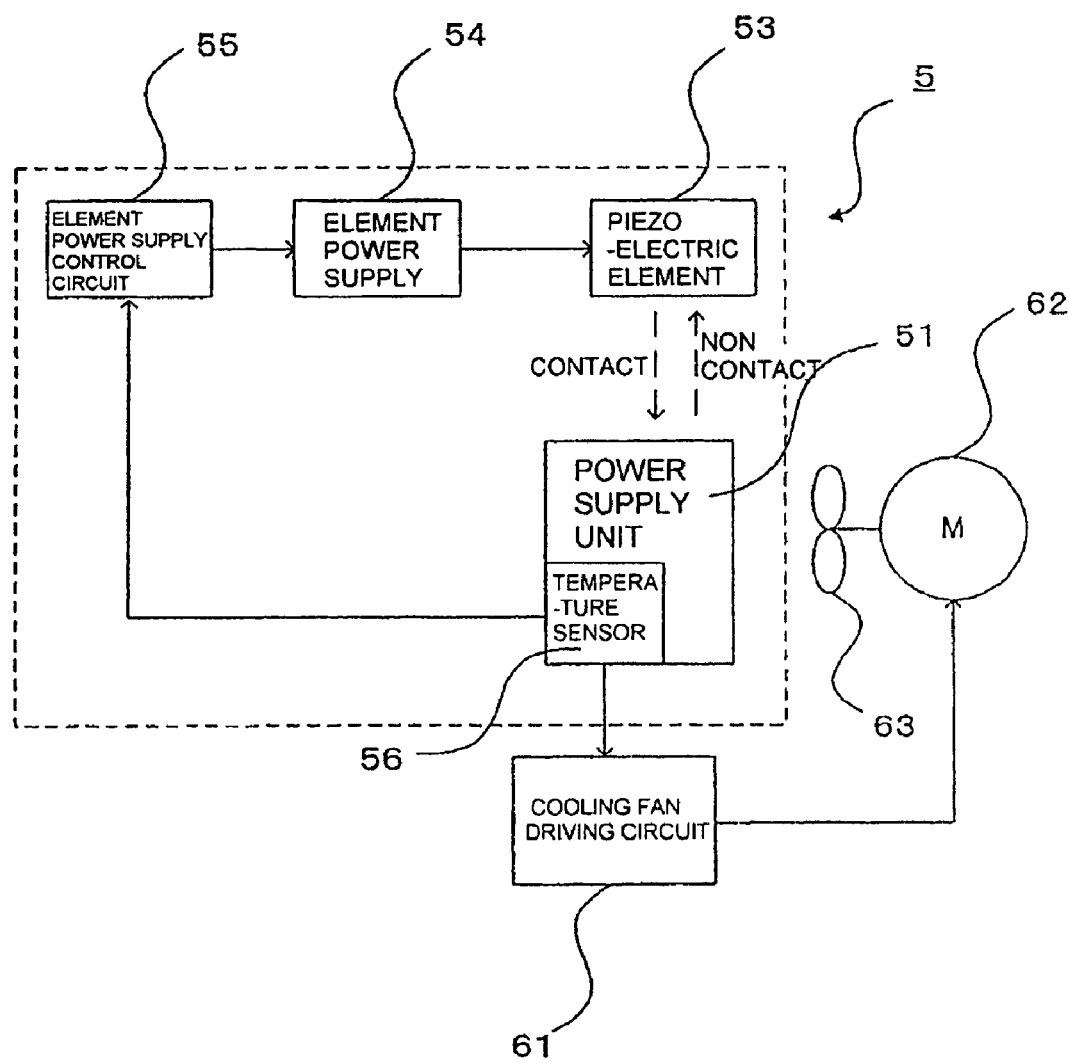
[FIG. 3] A block diagram showing the power supply apparatus.

Next, the configuration of the power supply apparatus 5 will be described with reference to FIGS. 1, 2, and 3. FIGS. 2(A) and 2(B) are section views illustrating the power supply apparatus 5, in which FIG. 2A shows a heat releasing state and FIG. 2B shows a heat insulating state. FIGS. 2(A) and 2(B) show only part of the floor panel 16 including a surface in contact with a piezoelectric element 53. FIG. 3 is a block diagram illustrating the power supply apparatus 5, in which arrows of solid lines indicate directions of signal flows and arrows of broken lines indicate mechanical motions.

The heat insulating state includes the condition where slight heat exchange may occur via an air layer formed between the piezoelectric element 53 and a power supply unit 51. Even in the heat insulating state, some heat exchange occurs via a bracket (holding portion) 52.

In FIGS. 2 and 3, the power supply unit 51 is realized by a lithium-ion battery incorporated into a hybrid car as a main battery thereof and is formed of a plurality of battery cells connected in series.

The power supply unit 51 is covered with a box-shaped battery back 51a and is supported by a bracket 52 which extends under the power supply unit 51 from a lower surface of the battery pack 51a (see FIGS. 2(A) and 2(B)).

The bracket 52 has, at its bottom end, a flange, not shown, which extends in a plane direction of the floor panel 16. The flange has a screw hole portion formed therein for fastening with a fastening bolt, not shown.

The floor panel 16 also has a screw hole formed therein opposite to the screw hole in the flange. The fastening bolt is inserted and tightened into these holes to secure the floor panel 16 to the bracket 52.

The bracket 52 can reliably space the power supply unit 51 and the floor panel 16. Since the floor panel 16 is made of steel, it can release heat of the power supply unit 51 efficiently. The bracket 52 may be made of stainless steel or aluminum, for example.

The piezoelectric element (electro-mechanical energy conversion element) 53 is provided between the power supply unit 51 and the floor panel 16 and is fixed onto the floor panel 16. A conductive polymer or an electrostriction elastomer may be used for the piezoelectric element 53, for example.

An electrode portion 53a is provided on each of end faces of the piezoelectric element 53 in a vertical direction (surfaces in contact with the power supply unit 51 and the floor panel 16). A direct-current element power supply (heat transfer power supply portion) 54 is mechanically and electrically connected to the electrode portions 53a. The element power supply 54 is always set on to allow application of a voltage to the piezoelectric element 53 not only during driving of the vehicle but also during stop thereof.

The piezoelectric element 53 is in contact with both the power supply unit 51 and the floor panel 16 (hereinafter referred to as the contact state) before a voltage is applied thereto from the element power supply 54. In response to a voltage applied from the element power supply 54 in the contact state, the piezoelectric element 53 is compressed vertically in contact with the floor panel 16 and is brought out of contact with the power supply unit 51 (hereinafter referred to as the noncontact state).

The piezoelectric element 53 switched in this manner between the contact state and the noncontact state can allow or prevent heat exchange between the floor panel 16 and the power supply unit 51. The piezoelectric element 53 contains an insulating filer (for example, made of aluminum nitride and aluminum oxide). The insulating filler can improve the heat transfer property of the piezoelectric element 53 to cool the power supply unit 51 quickly.

An element power supply control circuit (controller, control means) 55 is electrically connected to a temperature sensor (temperature detecting means) 56 provided for the power supply unit 51 and controls the application of a voltage by the element power supply 54 based on temperature information output from the temperature sensor 56.

In this manner, in Embodiment 1, the temperature of the power supply unit 51 is directly detected by using the temperature sensor and the heat radiation of the power supply unit 51 is controlled on the basis of the detection result. Thus, the temperature control of the power supply unit 51 can be performed more accurately as compared with the prior art using the heat-sensitive deformable element.

The temperature sensor 56 is also connected electrically to a cooling fan driving circuit 61 which drives a fan motor 62 based on the temperature information output from the temperature sensor 56. The driving of the fan motor 62 rotates a cooling fan 63 to produce cooling wind which can cool the power supply unit 51.

A driving power supply, not shown, for supplying the driving energy to the fan motor 62 is set off during the stop of the vehicle.

Since the temperature information for determining the driving timing of the cooling fan 63 and the piezoelectric element 53 can be obtained from the temperature sensor 56, it is not necessary to provide a temperature sensor independently for driving the piezoelectric element 53, thereby allowing a reduction in cost.

Figure 4:
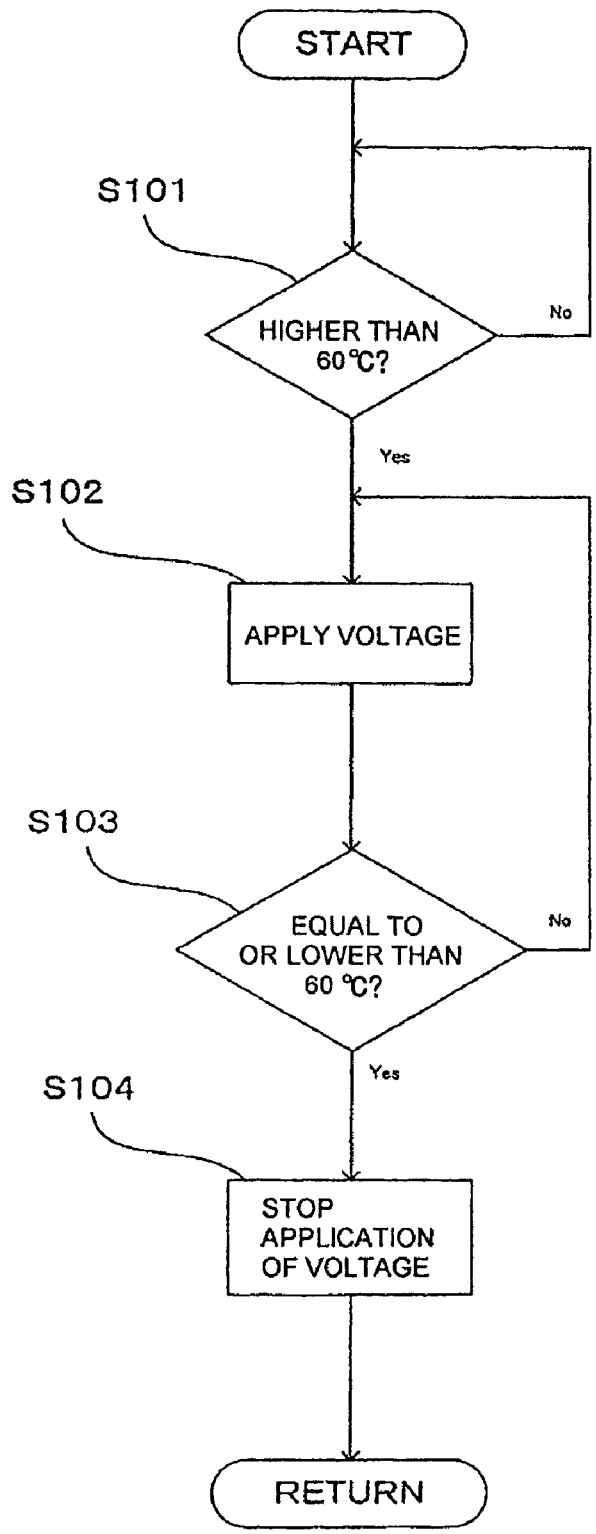
[FIG. 4] A flow chart showing the operation procedure in insulating and radiating heat in the power supply apparatus.

Next, the operation of the power supply apparatus 5 in insulating heat and releasing heat will be described with reference to FIG. 4 which shows a flow chart illustrating the operation procedure for insulating and releasing heat of the power supply apparatus 5.

In the initial state, the piezoelectric element 53 is set to the noncontact state in which it is out of contact with the power supply unit 51, that is, the heat insulating state.

First, the element power supply control circuit 55 determines whether or not the temperature of the power supply unit 51 exceeds a threshold temperature (60° C.) based on the temperature information from the temperature sensor 56 (step S101).

The threshold temperature is set to 60° C. because an electrolyte of a lithium-ion battery may be decomposed by an electric current to produce gas at a temperature higher than 60° C.

When the temperature of the power supply unit 51 is higher than 60° C., the element power supply 54 applies a voltage to the piezoelectric element 53 to cause the piezoelectric element 53 set to the noncontact state to be switched to the contact state (step S102).

The heat of the power supply unit 51 is radiated to the floor panel 16 via the piezoelectric element 53. This can prevent deterioration of the properties resulting from the high temperature of the power supply unit 51.

The element power supply 54 is provided independently of the driving power supply of the vehicle (that is, the power supply unit 51). Even when the temperature of the power supply unit 51 rises to exceed 60° C. during parking of the vehicle exposed to heat of sunlight after the engine is shut down, the heat of the power supply unit 51 can be radiated through the piezoelectric element 53 switched to the contact state.

The threshold temperature can be changed as appropriate according to the type of the power supply unit 51. For example, the threshold temperature may be set to approximately 100° C. when a fuel cell using a solid polymer as an electrolyte material is used as the power supply unit 51.

In this manner, according to Embodiment 1, simply changing the threshold temperature allows the use of a plurality of power supply units having different proper operating temperatures at appropriate operating temperatures. In other words, the present invention can eliminate the need to change the materials of the heat transferring portion (heat-sensitive deformable element) according to the proper operating temperature of the power supply as in the prior art. It is thus possible to save time and effort in selection of materials.

When the temperature of the power supply unit 51 is reduced below 60° C. due to the heat release (step S103), the application of the voltage from the element power supply 54 is stopped (step S104) to switch the piezoelectric element 53 set to the contact state into the noncontact state.

If the vehicle is stopped in a cold climate area and the temperature of the floor panel 16 is reduced (for example, to −10° C.) due to cool air, the air layer formed between the piezoelectric element 53 and the power supply unit 51 can prevent the release of the heat of the power supply unit 51 from the floor panel 16.

This can avoid the release of the heat of the power supply unit 51 to the outside during charge and discharge, so that the temperature of the power supply unit 51 can be increased quickly to the optimal temperature (approximately 30° C.).

(Modifications)

The outer surface of the piezoelectric element 53 may be covered with a heat transferring member (for example, stainless steel and copper) having a higher thermal conductivity than that of the piezoelectric element 53. This can improve the heat transfer property of the piezoelectric element 53.

The piezoelectric element 53 may be placed only in an area (or a plurality of areas) where the temperature is particularly high based on the distribution of temperature during charge and discharge of the power supply unit 51. This can reduce the volume of the piezoelectric element 53 to allow a reduction in cost.

The temperature sensor 56 may be omitted. In this case, for example, the control of the switch of the piezoelectric element 53 may be associated with the driving of air heating. The piezoelectric element 53 is switched to the noncontact state only for a predetermined time period after the start of the heating and is switched to the contact state after the lapse of the predetermined time period. Alternatively, the switch of the piezoelectric element 53 may be controlled on the basis of temperature information from a temperature detecting sensor (not shown) for detecting the temperature of cooling water for cooling the engine.

The piezoelectric element 53 may be fixed to the power supply unit 51 and may be brought into and out of contact with the floor panel 16. Alternatively, the piezoelectric element 53 may be placed at a position away from the power supply unit 51 and the floor panel 16 in an area between the power supply unit 51 and the floor panel 16 such that the piezoelectric element 53 may be brought into contact with both the power supply unit 51 and the floor panel 16 in the heat radiating state.

While the power supply apparatus 5 is placed under the passenger seat 11 in Embodiment 1, it may be disposed between seats.

While the power supply unit is formed of a lithium ion battery, the present invention is applicable to another type of secondary battery (for example, a nickel metal hydride battery), fuel cell, or electric double layer capacitor.

The invention claimed is:

1. A power supply apparatus comprising:
a power supply unit;
a piezoelectric element transferring heat of the power supply unit to a heat releasing portion; and
a controller that controls application of a voltage to the piezoelectric element,
wherein the piezoelectric element is placed between the power supply unit and the heat releasing portion and is switched between a contact state in which the piezoelectric element is in contact with the power supply unit and the heat releasing portion and a non-contact state in which the piezoelectric element is not in contact with the power supply unit and/or the heat releasing portion in accordance with the application of a voltage.

2. The power supply apparatus according to claim 1, wherein the controller controls the application of a voltage in accordance with a temperature of the power supply unit.

3. The power supply apparatus according to claim 2, wherein the controller controls the application of a voltage to cause the piezoelectric element to be in the non-contact state when the temperature of the power supply unit is equal to or lower than a threshold value.

4. The power supply apparatus according to claim 1, further comprising a holding portion holding the power supply unit such that the power supply unit and the heat releasing portion are spaced.

5. The power supply apparatus according to claim 1, further comprising temperature detecting portion that detects a temperature of the power supply unit,
wherein the controller controls the application of a voltage based on the detection result of the temperature detecting portion.

6. The power supply apparatus according to claim 5, wherein the temperature detecting portion outputs temperature information to a coolant supplying portion that supplies a coolant to the power supply unit based on the temperature of the power supply unit.

7. The power supply apparatus according to claim 1, wherein the piezoelectric element includes an insulating filler.

8. The power supply apparatus according to claim 1, wherein the heat releasing portion is a body of a vehicle.

9. The power supply apparatus according to claim 1, further comprising a heat transfer power supply portion producing a voltage to be applied to the piezoelectric element, wherein the heat transfer power supply portion in independent of the power supply unit.

10. A power supply apparatus comprising:
a power supply unit;
an piezoelectric element transferring heat of the power supply unit to a heat releasing portion; and
a control means that controls application of a voltage to the piezoelectric element,
wherein the piezoelectric element is placed between the power supply unit and the heat releasing portion and is switched between a contact state in which the piezoelectric element is in contact with the power supply unit and the heat releasing portion and a non-contact state in which the piezoelectric element is not in contact with the power supply unit and/or the heat releasing portion in accordance with the application of a voltage.

* * * * *